United States Patent
Lee et al.

(10) Patent No.: US 7,324,457 B2
(45) Date of Patent: Jan. 29, 2008

(54) METHOD AND APPARATUS FOR COMPENSATING FOR OPTICAL TRANSMISSION DELAY IN A SYNCHRONOUS MOBILE COMMUNICATION SYSTEM USING SYNCHRONOUS DIGITAL HIERARCHY

(75) Inventors: Hyun-Pyo Lee, Inchonkwangyok-shi (KR); Kwang-Hee Han, Kyonggi-do (KR); Jeong-Deog Seo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1216 days.

(21) Appl. No.: 10/341,407

(22) Filed: Jan. 14, 2003

(65) Prior Publication Data
US 2003/0185571 A1 Oct. 2, 2003

(30) Foreign Application Priority Data
Jan. 15, 2002 (KR) ............... 10-2002-0002379

(51) Int. Cl.
*G01R 31/08* (2006.01)

(52) U.S. Cl. ............ 370/249; 370/519; 398/161; 398/119

(58) Field of Classification Search ............ None
See application file for complete search history.

(56) References Cited

U.S. PATENT DOCUMENTS 6,807,178 B1 * 10/2004 Lemieux ............ 370/395.2
7,039,067 B2 * 5/2006 Feinberg et al. ........... 370/468

* cited by examiner

*Primary Examiner*—Duc Ho
(74) *Attorney, Agent, or Firm*—Roylance, Abrams, Berdo & Goodman, L.L.P.

(57) ABSTRACT

A method and apparatus are disclosed for compensating for optical transmission delays in a synchronous mobile communication system. A Base Station Transceiver Subsystem (BTS) includes a Main Unit (MU) for processing a mobile communication signal and a plurality of Remote Units (RUs) connected to the MU by Synchronous Digital Hierarchy (SDH) transmission, for performing radio processing for communication with a Mobile Station (MS). The method comprises the steps of sequentially forming a loop on an optical transmission line to each of the RUs for optical transmission delay compensation test between the MU and each of the RUs; once a loop for the optical transmission delay compensation test is formed, transmitting a test SDH frame to a corresponding RU, and measuring a delay time until the test SDH frame is fed back; and transmitting data to the corresponding RU after compensating the transmission time by the measured delay time.

10 Claims, 6 Drawing Sheets

METHOD AND APPARATUS FOR COMPENSATING FOR OPTICAL TRANSMISSION DELAY IN A SYNCHRONOUS MOBILE COMMUNICATION SYSTEM USING SYNCHRONOUS DIGITAL HIERARCHY

PRIORITY

This application claims priority under 35 U.S.C. § 119 to an application entitled "METHOD AND APPARATUS FOR COMPENSATING FOR OPTICAL TRANSMISSION DELAY IN A SYNCHRONOUS MOBILE COMMUNICATION SYSTEM USING SYNCHRONOUS DIGITAL HIERARCHY" filed in the Korean Industrial Property Office on Jan. 15, 2002 and assigned Serial No. 2002-2379, the contents of which are incorporated herein by reference.

BACKGROUND OF THE INVENTION

1. Field of the Invention

The present invention relates generally to a synchronous mobile communication system, and in particular, to a method and apparatus for compensating for optical transmission delay in a Base Station Transceiver Subsystem (BTS) using a Synchronous Digital Hierarchy (SDH) in a synchronous code division multiple access (CDMA) system.

2. Description of the Related Art

In general, a mobile communication system includes a mobile switching center (MSC), a Base Station Controller (BSC) and a Base Station Transceiver Subsystem (BTS), and is wirelessly connected to a Mobile Station (MS) to provide a mobile communication service. The MSC performs switching control for connecting a speech path between the BSC and a Public Switched Telephone Network (PSTN) or between the BSC and a Public Land Mobile Network (PLMN). The BSC controls a wire link and a wireless link, and further controls handover operations. The BTS, together with the MS, forms a radio communication path, and manages radio resources.

In the mobile communication system, a BTS includes, when necessary, a Main Unit (MU) for processing a CDMA digital signal, and a Remote Unit (RU) for actually transmitting and receiving data to/from a mobile station. The RU modulates a signal onto a Radio Frequency (RF) carrier, and also demodulates the modulated RF carrier, thereby removing the carrier and providing the original modulating signal.

Figure 1:
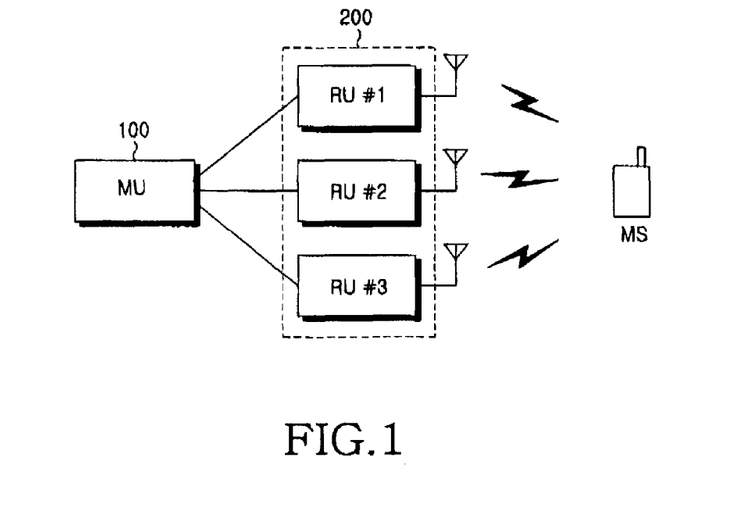
FIG. 1 illustrates a mobile communication system in which a BTS has an MU-RU structure.

FIG. 1 illustrates a mobile communication system in which a BTS has an MU-RU structure. As illustrated in FIG. 1, an MU 100 of the BTS is connected to a plurality of RUs 200. The MU 100 can be connected to each of the RU 200 via an optical line. The connection through an optical line contributes to high-speed transmission of a large quantity of signals. In addition, the transmission through an optical line enables long-range transmission of a signal due to a low signal loss characteristic of the optical line.

The distance between the MU 100 and each of the RUs 200 depends upon the location of each RU 200. The signals transmitted from the MU 100 to each of the RUs 200 can have different transmission delays due to the difference in distance between the MU 100 and each of the RUs 200. Although different transmission delays exist, if a mobile station performs communication within only one RU, no problem arises. However, if a handover occurs, the differences in transmission delays may bring about a call drop or reduce call quality. The problem of different transmission delays between an MU 100 and different RUs 200 is described on the assumption that a handover occurs as a mobile station in communication with a first RU connected to the MU 100 moves to a region covered by a second RU. The transmission delay time between the MU 100 and the first and second RUs 200 depends upon a mutual distance therebetween.

By way of example, when the mobile station moves from a location covered by RU#3 to a location covered by RU#2, in FIG. 1, a signal transmitted by both RU #2 and RU #3, which should occur at the same point in time, will actually be transmitted at different points in time, because of the different delay times between each RU 200 and the MU 100. Thus, when a handover occurs, the mobile station may receive the same two signals at different points in time, thereby generating a fatal error. The fatal error results because a handover is only possible when the transmission signals have the same phase at each of the three RU points (i.e., RU#1, RU#2 and RU#3).

, a connection between the MU 100 and the RUs 200 constituting the BTS is made with an optical line. There are two methods of connecting the MU 100 to the RUs 200 with an optical line for signal transmission: one is to optically modulate/demodulate an analog electric signal and directly connect the modulated/demodulated signal to an optical interface, and the other is to process a signal at a data link layer for data communication before optical modulation/demodulation in order to transmit the signal more stably. The former is typically used in an optical repeater, and the latter is used in various transmission systems, including, for example, in Local Area Networks (LANs).

A more detailed description of the conventional technology will be made below with reference to the accompanying drawings.

Figure 2:
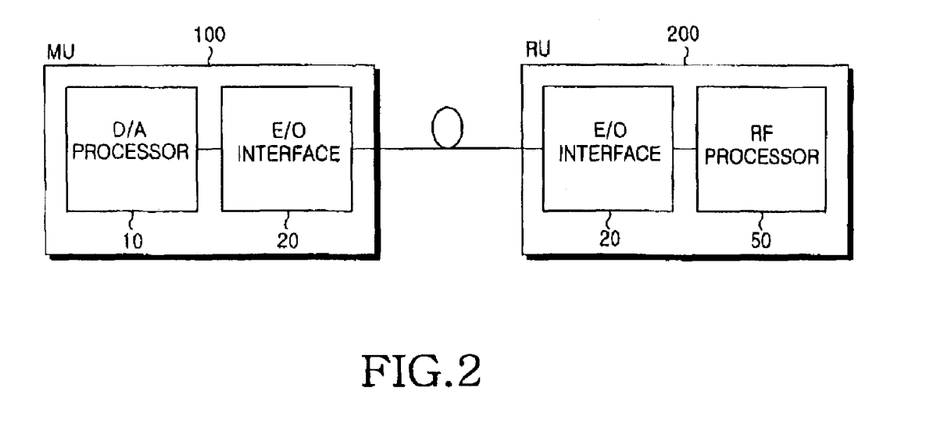
FIG. 2 illustrates an example of a mobile communication system in which an MU is directly connected to an RU with an optical interface according to the prior art.
Figure 3:
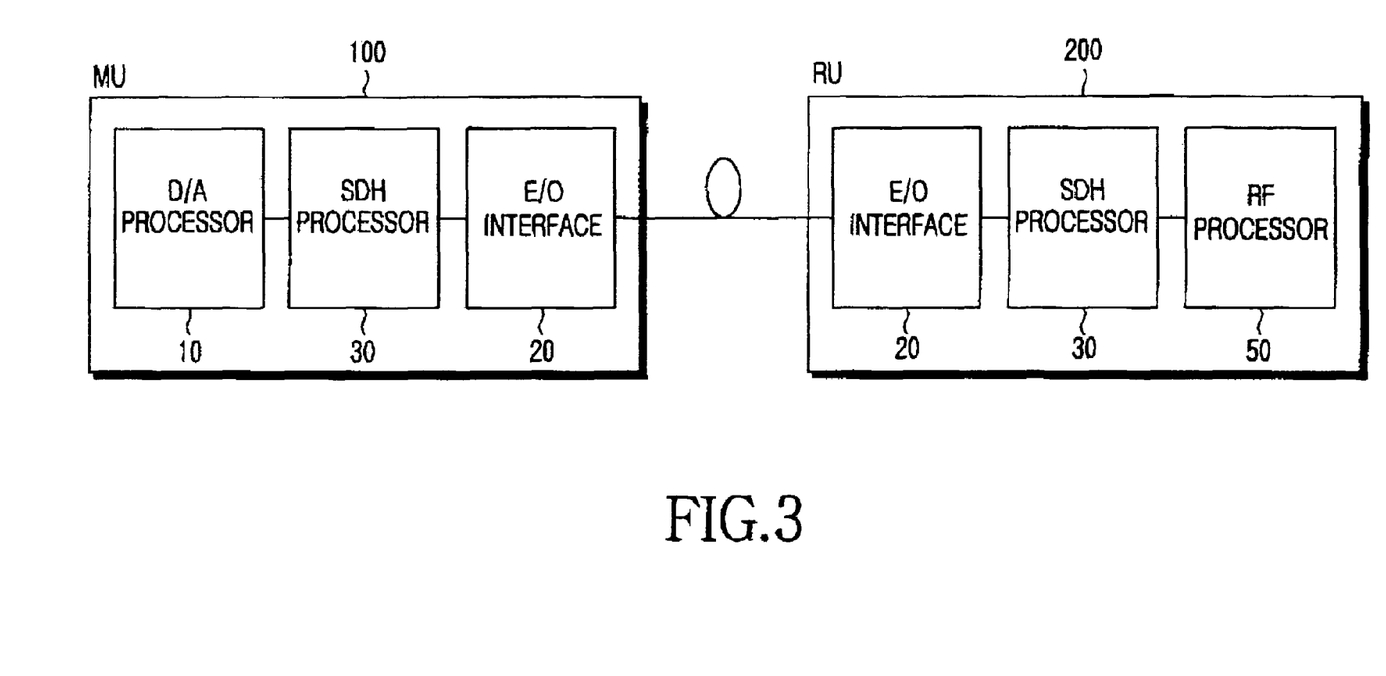
FIG. 3 illustrates a structure, of a common SDH transmission system for performing signal processing at a data link layer for data communication before optical modulation/demodulation.

FIG. 2 illustrates an example of a mobile communication system in which an MU 100 is directly connected to an RU 200 with an optical interface according to the prior art, and FIG. 3 illustrates a structure of a common SDH transmission system for performing signal processing at a data link layer for data communication before optical modulation/demodulation.

FIG. 2 shows the former method of transmitting a signal between the MU 100 and the RU 200 connected through an optical transmission line. The MU 100 includes a digital/analog processor 10 and an Electric/Optic (E/O) interface 20, and the RU 200 includes an E/O interface 20 and an RF processor 50. Here, a digital signal between the MU 100 and the RU 200 is converted from an electric signal to an optical signal without separate signal processing, i.e., using the E/O interface 20. Therefore, in order to compensate for the time delay of a signal due to the distance between the MU 100 and the RU 200, it is necessary to provide a complex apparatus for measuring distance and compensating for the time delay according to the measured distance on a case-by-case basis, or measuring separately the time delay of the signal due to the optical transmission line and providing the measured time delay to the MU 100.

FIG. 3 shows the latter method of performing signal processing at a data link layer before signal transmission between the MU 100 and the RU 200 connected through an optical transmission line. Specifically, FIG. 3 illustrates an example of a common SDH transmission system. Referring to FIG. 3, the SDH transmission system includes an SDH processor 30, a block for processing a signal at an upper layer before the signal passes through an E/O interface 20 of the MU 100. The SDH transmission technique of FIG. 3, being a technique for stably transmitting high-speed data, is fundamentally based on a packet switching technique which disregards the arrival time delay of a signal due to the distance between the MU 100 and the RU 200. In this case, since development of the technology is focused on transmitting high-speed data over a distance without any errors, arrival time delay of a signal due to the distance between the MU 100 and the RU 200 has never been considered.

However, since the system for directly modulating a digital signal, described in conjunction with FIG. 2, has no overhead, it cannot check various signal transmission-related states and perform state management and error detection on the transmission system. In addition, the technique of FIG. 2 must disadvantageously separately provide the MU 100 with an apparatus for measuring the time delay of a signal due to the optical transmission line. Further, the common SDH transmission system of FIG. 3, in which the time delay of a signal is never considered, cannot be applied to a synchronous mobile communication system which is very susceptible to a phase of a signal. That is, if the conventional method of FIG. 3 is applied to the synchronous mobile communication system without applying any measures for correcting transmission delays, it will not be possible to compensate for the time delay of a signal from a physical optical interface interposed between the MU 100 and the RU 200. As a result, a handover for securing mobility in a mobile communication system may fail, or a mobile station may not detect a signal, causing a call drop.

SUMMARY OF THE INVENTION

An object of the present invention is to substantially solve at least the above problems and/or disadvantages and to provide at least the advantages described below. Accordingly, it is an object of the present invention to provide a method and apparatus for compensating for optical transmission delay in a mobile communication system using Synchronous Digital Hierarchy (SDH).

It is another object of the present invention to provide an optical transmission delay compensation method and apparatus for realizing communication between a Main Unit (MU) and a Remote Unit (RU) by an SDH technique in a mobile communication system wherein a Base Station Bransceiver Subsystem (BTS) includes the MU and the RU.

To achieve the above and other objects, the present invention provides a method for compensating for optical transmission delay in a synchronous mobile communication system in which a Base Station Transceiver Subsystem (BTS) includes a Main Unit (MU) for processing a mobile communication signal and a plurality of Remote Units (RUs) connected to the MU by Synchronous Digital Hierarchy (SDH) transmission, for performing radio processing for communication with a Mobile Station (MS). An embodiment of the method comprises the steps of sequentially forming a loop on an optical transmission line to each of the RUs for an optical transmission delay compensation test between the MU and each of the RUs, and once a loop for the optical transmission delay compensation test is formed, transmitting a test SDH frame to a corresponding RU. The method further comprises the steps of measuring a delay time until the test SDH frame is fed back, and transmitting data to the corresponding RU after compensating the transmission time as much as the measured delay time.

To achieve the above and other objects, the present invention also provides an apparatus for compensating for optical transmission delay in a Main Unit (MU) for a synchronous mobile communication system in which a Base Station Transceiver Subsystem (BTS) includes the MU for processing a mobile communication signal and a plurality of Remote Units (RUs) connected to the MU by Synchronous Digital Hierarchy (SDH) transmission, for performing radio processing for communication with a Mobile Station (MS). An embodiment of the apparatus comprises a framer for controlling formation of a loop for an optical transmission delay compensation test with each of the RUs, generating and transmitting a test frame, detecting a feedback test frame, and calculating a delay time from a point where the test frame is generated to a point where the feedback frame is detected. The apparatus also comprises an Electric/Optic (E/O) interface for converting information output from the framer into an optical signal to transmit the optical signal to a corresponding RU and converting an optical signal received from a particular RU into an electric signal to provide the electric signal to the framer. The apparatus further comprises a digital processor for compensating the phase of the data signal to be transmitted to the RUs according to the delay time calculated by the framer, and providing the phase-compensated data to the framer.

BRIEF DESCRIPTION OF THE DRAWINGS

The above and other objects, features and advantages of the present invention will become more apparent from the following detailed description of preferred embodiments thereof when taken in conjunction with the accompanying drawings, in which.

DETAILED DESCRIPTION OF THE PREFERRED EMBODIMENTS

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein have been omitted for conciseness.

A plurality of RUs connected to an MN may be installed at different distances. Therefore, in an embodiment of the present invention, a delay calculator included in an MU calculates the time delay between the MU and each RU connected to the MU. The delay calculator for calculating time delay and an SDH processor for processing an optical signal are included in a framer, and the framer is included in the MU. The SDH processor of the MU forms a separate channel using an unused reserved field in an overhead of an SDH frame. Further, the SDH processor transmits information for time calculation over the channel between the MU and the RU, and provides a value received from the RU to the delay calculator. The delay calculator then calculates a delay value according to a distance from the MU to the RU, and compensates for the delay. In this way, a mobile communication system can enjoy an advantage that exists in SDH transmission technology. The advantage is the capability of transmitting a large quantity of signals over a great distance due to the low loss characteristic of an optical transmission line. This advantage can be applied to the MU and the RU in a BTS for a mobile communication system.

In addition, the time delay due to an optical transmission line can be calculated and measured using a delay calculator with simple logic, i.e., a delay counter, in a framer which is a block nearest to an E/O interface. This becomes a time delay calculation and measurement method for minimizing expansion of an error generated when calculating optical transmission delay, without using an overhead, by providing an optical transmission delay calculation block to an upper block. Further, in another embodiment of the present invention, information on the optical transmission time delay measured by the delay calculator of the framer is reported to the upper block of the MU, and the upper block synchronizes phases of signals transmitted to the RUs taking into account the measured optical transmission time delay.

Figure 4:
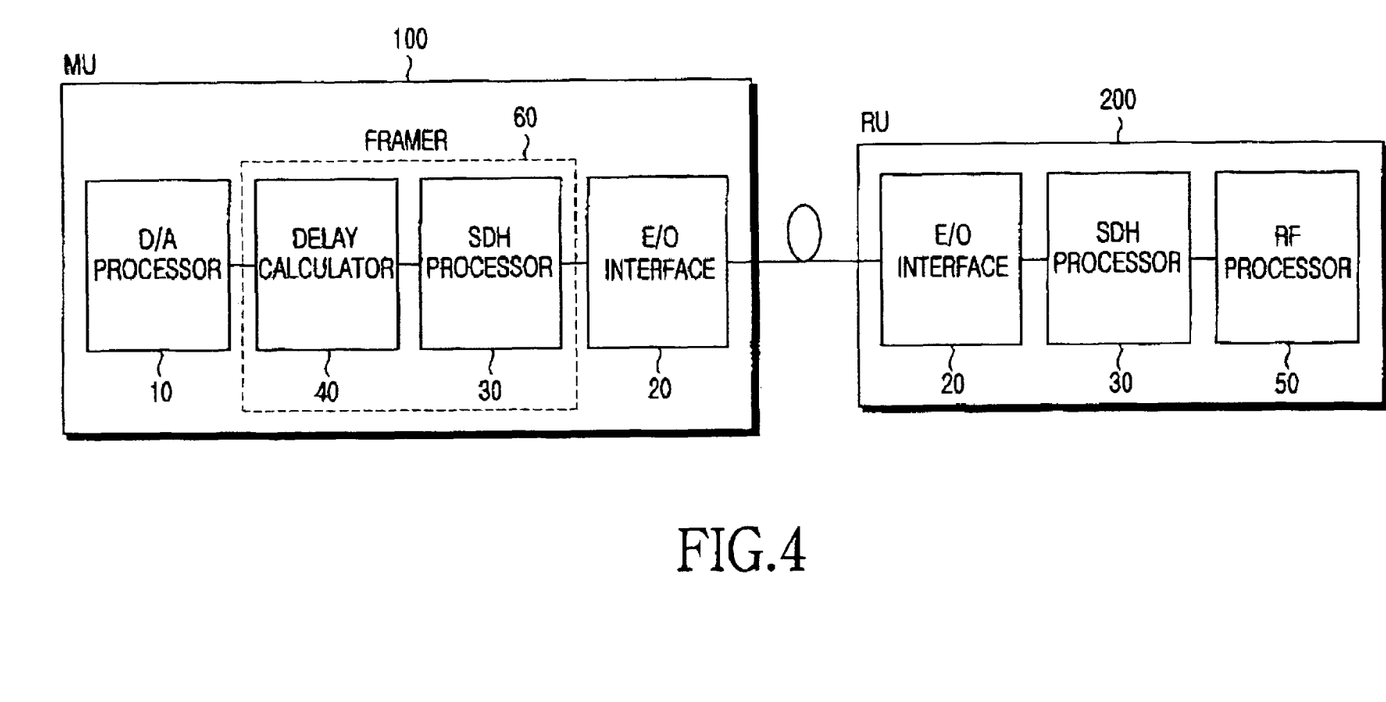
FIG. 4 is a block diagram for compensating for optical transmission delay in a BTS for a synchronous mobile communication system using an SDH transmission technique according to an embodiment of the present invention.

FIG. 4 is a block diagram for compensating for optical transmission delay in a BTS for a synchronous mobile communication system using an SDH transmission technique according to an embodiment of the present invention. Referring to FIG. 4, in a synchronous mobile communication system according to an embodiment of the present invention, an MU 100 is connected to an RU 200 via an optical transmission line. The MU 100 includes a digital processor 10 which is an upper block, a framer 60, and an E/O interface 20. The framer 60 includes an SDH processor 30 and a delay calculator 40. Further, the RU 200 includes an E/O processor 20, an SDH processor 30 and an RF processor 50.

In an embodiment of the present invention, in addition to the SDH processor 30, the delay calculator 40 is added to the framer 60 neighboring the E/O interface 20 of the MU 100, as illustrated in FIG. 4. Generally, the framer 60 generates a frame for a signal to be transmitted between the MU 100 and the RU 200. According to the embodiment of the present invention shown in FIG. 4, the SDH processor 30 of the MU 100 transmits a test pattern-inserted SDH frame to a test RU by inserting a test pattern in a predetermined field among unused reserved fields in an overhead of an SDH frame. The delay calculator 40 performs a counting operation in synchronism with a test signal transmission point. The MU 100 receives an SDH frame fed back from the RU being tested, and provides a count stop signal to the delay calculator 40 upon detecting the transmitted test pattern from the received SDH frame. In this way, it is possible to calculate time delay due to a distance from the MU to a particular RU.

The delay calculator 40 can be realized with a simple logic, for example, a delay counter. Further, as stated above, the delay calculator 40, when the SDH processor 30 inserts or transmits a test pattern, performs a counting operation in synchronism with a corresponding clock, and stops the counting operation in response to a count stop signal from the MU 100 SDH processor 30 upon detecting the transmitted test pattern returned from the RU being tested. As the counting operation is stopped, the delay calculator 40 reports a count value counted according to insertion and detection of the test pattern to the digital processor 10, an upper block, as optical transmission time delay information. By calculating the time delay occurring in an optical transmission line at the framer 60 nearest to the E/O interface 20, it is possible to reduce the time delay error. In addition, by implementing the delay calculator 40 as part of the framer 60 with a simple logic, it is possible to prevent an increase in system complexity.

The optical transmission time delay information measured by the delay calculator 40 in the framer 60 is reported to the digital processor 10 in the MU 100. The digital processor 10 then synchronizes phases of signals wirelessly to be transmitted to a plurality of RUs 200 by taking into consideration the reported optical transmission time delay information, for signal transmission.

A method of compensating for time delay of a signal due to an optical transmission line according to an embodiment of the present invention will now be described with reference to FIGS. 5 to 7.

Figure 5:
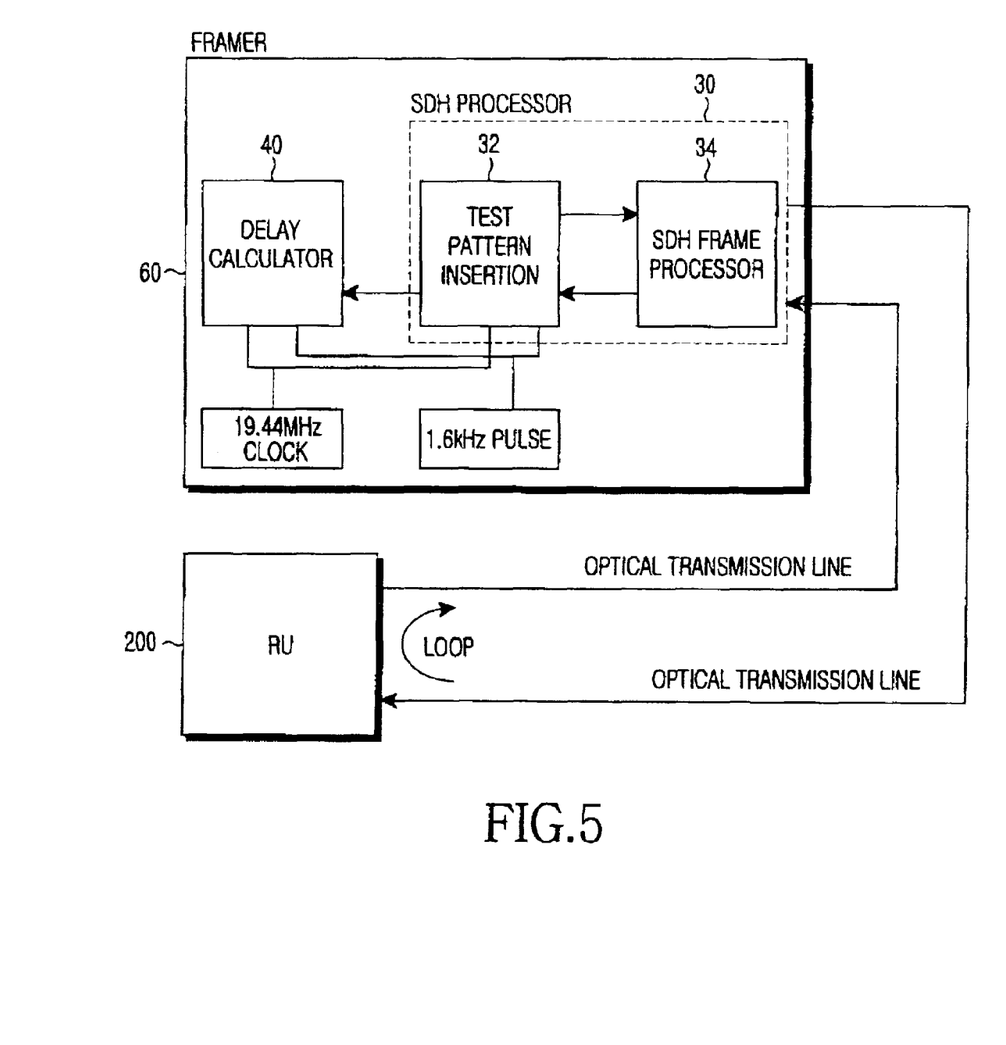
FIG. 5 is a block diagram illustrating a method for measuring optical transmission time delay due to an optical transmission line connected between the MU and the RU according to an embodiment of the present invention.
Figure 6:
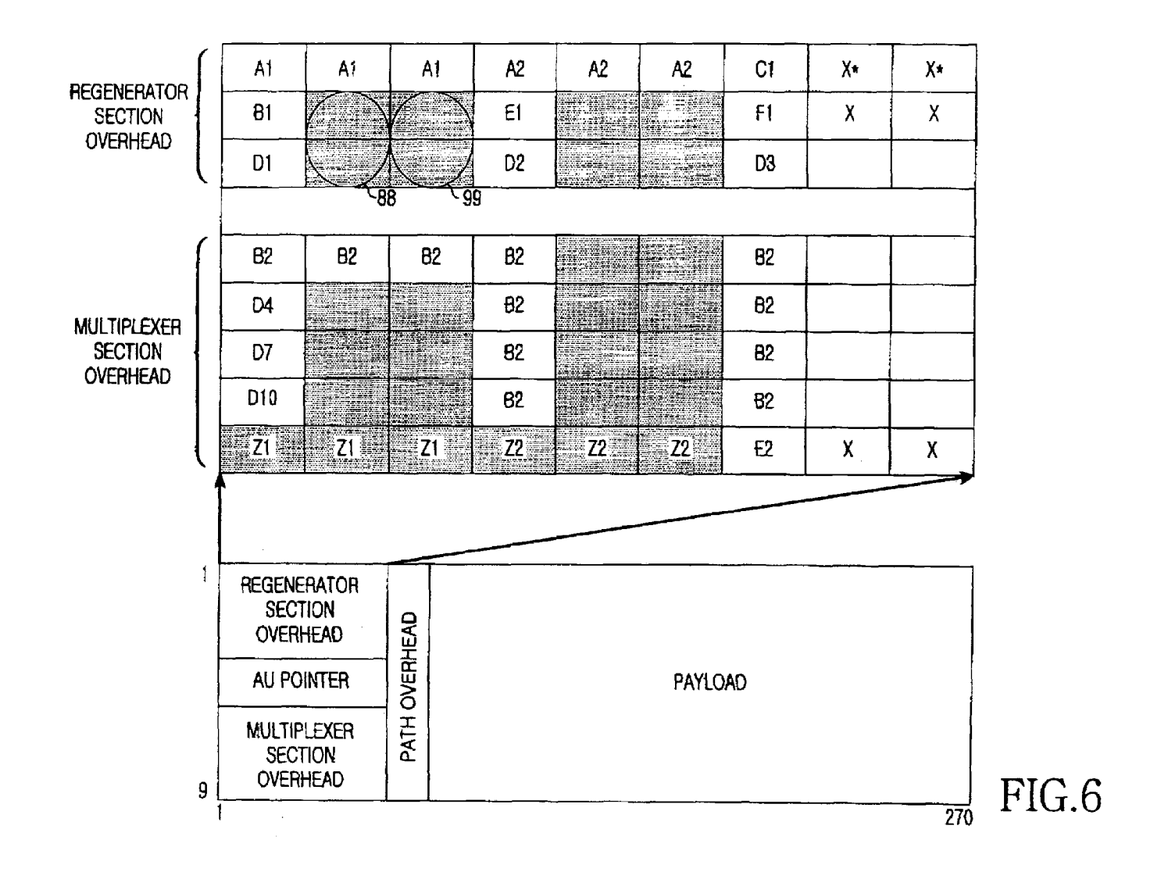
FIG. 6 illustrates an overhead and a frame format of an SDH frame used to calculate time delay due to an optical transmission line according to an embodiment of the present invention.

FIG. 5 is a block diagram illustrating a method for measuring optical transmission time delay due to an optical transmission line connected between the MU 100 and the RU 200 according to an embodiment of the present invention, and FIG. 6 illustrates an overhead and a frame format of an SDH frame used to calculate time delay due to an optical transmission line according to an embodiment of the present invention.

Referring to FIG. 5, the framer 60 of the MU 100 according to an embodiment of the present invention includes the delay calculator 40 and the SDH processor 30, and the SDH processor 30 includes a test pattern insertion and detection block 32 and an SDH frame processor 34. The delay calculator 40 and the test pattern insertion and detection block 32 are both provided with a 1.6 KHz and a 19.44 MHz clock.

In the embodiment of the present invention, a loop is formed from the MU 100 to a specified RU to be tested (hereinafter, referred to as a "test RU") among a plurality of RUs 200, as illustrated in FIG. 5, in order to measure time delay of an optical transmission line connected between the MU 100 and the RU 200. According to the loop forming method, the MU 100 transmits a loop forming request signal for transmitting a test pattern signal, to the test RU 200. Upon receiving the loop forming request signal, the test RU 200 loops an optical transmission line with an internal switch.

If a loop for performing a test between the MU 100 and the test RU 200 is formed, the test pattern insertion and detection block 32 of the MU 100 in FIG. 5 generates a test pattern and provides the generated test pattern to the SDH frame processor 34. The SDH frame processor 34 inserts the provided test pattern into a predetermined field among unused reserved fields in an overhead of an SDH frame, and transmits the test pattern-inserted SDH frame to the test RU through the E/O interface 20 (not shown in FIG. 5). A method of inserting the test pattern into a predetermined reserved field in an overhead will be described in detail with reference to FIG. 6.

As illustrated in FIG. 6, one frame is divided into (i) an SDH overhead comprised of a regeneratorsection overhead, an AU pointer, a multiplexer section overhead and a path overhead, and (ii) a payload for transmitting actual data along with the SDH overhead. A detailed structure of overheads illustrated in an upper part of FIG. 6 will now be described.

Among the overheads illustrated in FIG. 6, white blocks represent fields previously defined in the SDH transmission specification, and dark blocks included in the regenerator section overhead and the multiplexer section overhead represent unused reserved fields. Therefore, in the embodiment of the present invention, a specific test pattern for calculating or measuring time delay of an optical transmission line can be inserted into the dark reserved fields. Preferably, the present invention inserts an 8-bit test pattern in each of 1-byte fields represented by reference numerals 88 and 99 of FIG. 6, among the dark fields. For example, the 8-bit test pattern may have a value of "01000000" or "00100000."

The test pattern insertion and detection block 32 provides the test pattern to the SDH frame processor 34 in order to insert the test pattern in an SDH frame. At this point, the test pattern insertion and detection block 32 drives the delay calculator 40, which comprises a counter. As a result, the delay calculator 40 performs a counting operation in response to a system clock of 19.44 MHz. Meanwhile, as stated above, the SDH frame processor 34 inserts the test pattern in the unused reserved field in the overhead of the SDH frame, and transmits the test pattern-inserted SDH frame to the test RU 200 through the previously formed loop of an optical transmission line. Although not illustrated in FIG. 5, an E/O interface included in the MU 100 converts the test pattern signal into an optical signal. Therefore, the test RU 200, since it has already formed a loop to the MU 100, feeds back the test pattern-inserted SDH frame to the SDH processor 30 of the MU 100. In this case, the E/O interface of the MU 100 converts an optical input signal into an electric signal, and provides the converted electric signal to the SDH processor 30.

The SDH frame processor 34 of the MU 100 receives the SDH frame and transmits the received SDH frame to the test pattern insertion and detection block 32. The test pattern insertion and detection block 32 then detects a test pattern existing in the 1-byte fields of the overhead, represented by reference numerals 88 and 99 in FIG. 6. Upon detecting the test pattern, the test pattern insertion and detection block 32 stop the delay calculator 40. The delay calculator 40 transmits the SDH frame the overhead of which a specific test pattern has been inserted, to the RU 200, and counts the time required for detecting the feedback test pattern. The delay calculator 40 transmits the count value to the digital processor 10 in order to measure the time delay of the signal due to the optical transmission line connected between the MU 100 and the test RU 200, and uses the measured time delay as a compensation value during signal transmission.

The time delay of a signal due to an optical transmission line can be measured by subtracting the processing time of the SDH frame processor 34 from the time [(count value)/19.44 MHz or (count value)*(period of system clock)] counted by the delay counter (or the delay calculator 40), and then dividing the subtraction result by 2. This can be expressed by equation (1) below.

$$T_{delay} = \frac{\frac{T_{count}}{19.44 \text{ MHz}} - T_{process}}{2} \text{ or } \frac{(T_{count} \times P_{Clock}) - T_{process}}{2} \quad (1)$$

In equation (1), $T_{delay}$ represents the time delay of the signal due to the optical transmission line, $T_{count}$ represents the count value counted by the delay calculator 40, $T_{process}$ represents the processing time of the SDH frame processor 34, and $P_{clock}$ represents the period of the system clock.

Figure 7:
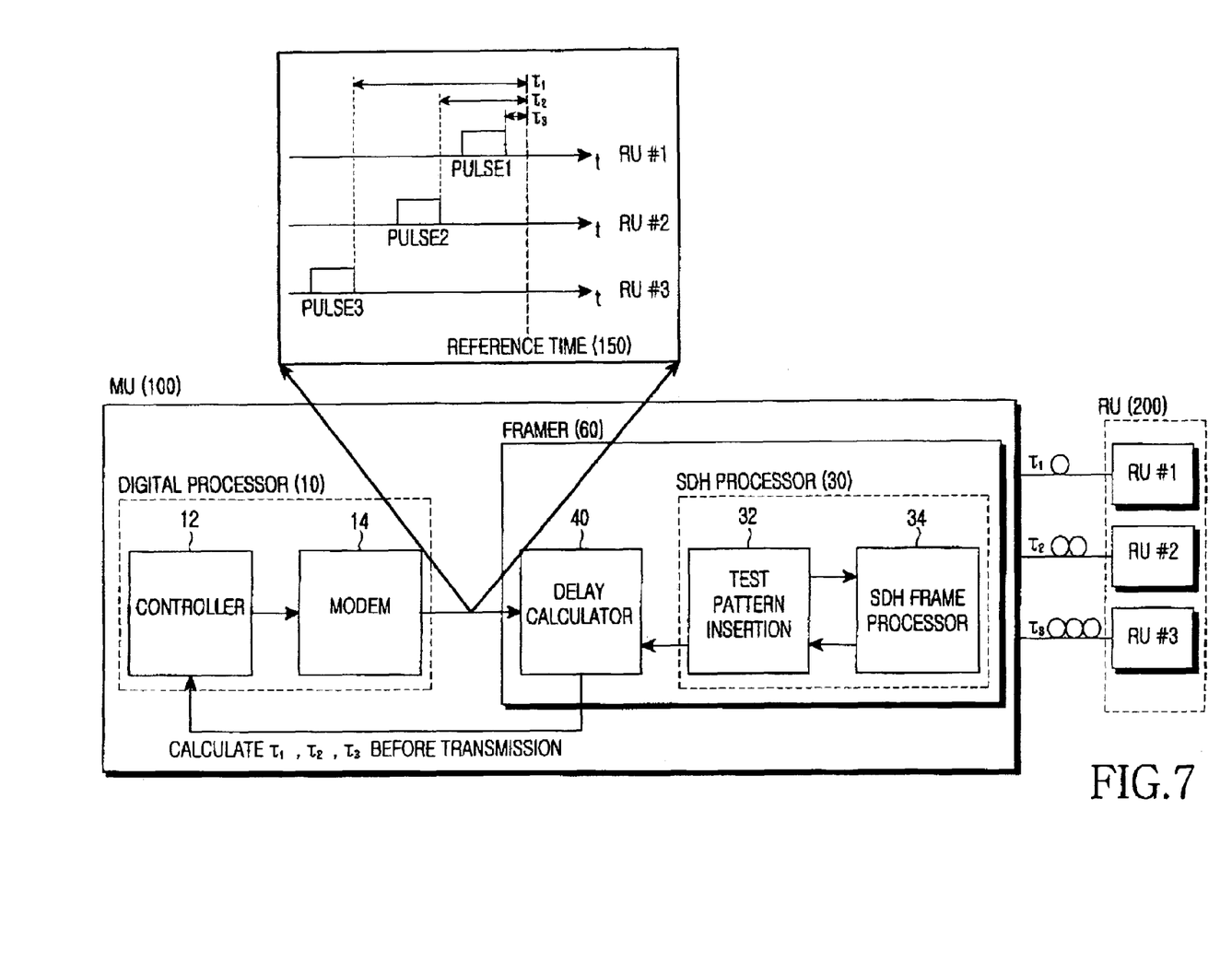
FIG. 7 is a block diagram illustrating a method of compensating for time delay caused by an optical transmission line according to an embodiment of the present invention.

FIG. 7 is a block diagram illustrating a method of compensating for the time delay caused by an optical transmission line according to an embodiment of the present invention. Referring to FIG. 7, time delay values $\tau_1$, $\tau_2$, and $\tau_3$ of a signal on an optical transmission line, measured for RU#1, RU#2 and RU#3 by the SDH processor 30 and the delay calculator 40 of the MU 100, as described in conjunction with FIG. 5, are reported to a controller 12 of the digital processor 10. The controller 12 then controls output signals such that signals transmitted to the RU#1, RU#2 and RU#3 have the same phase at a certain point in time, based on the measured time delay values $\tau_1$, $\tau_2$, and $\tau_3$. In FIG. 7, $\tau_1$ represents a time delay value of a signal due to an optical transmission line connected to the MU 100 and the RU#1, $\tau_2$ represents a time delay value of a signal due to an optical transmission line connected to the MU 100 and the RU#2, and $\tau_3$ represents a time delay value of a signal due to an optical transmission line connected to the MU 100 and the RU#3.

The controller 12 controls the time delay of a signal transmitted to each RU 200 through a modem 14 based on the measured time delay values $\tau_1$, $\tau_2$ and $\tau_3$, thereby compensating for the time delay of the signal due to the optical transmission lines. More specifically, the MU 100 is connected to each of three RUs 200 located at different distances from the MU 100 through three individual optical transmission lines. It is assumed that the distance from the MU 100 to the RU#1 is shortest and the distance from the MU 100 to the RU#3 is longest. The controller 12 of the digital processor 10 can calculate time delay values $\tau_1$, $\tau_2$ and $\tau_3$ due to optical transmission lines according to the distances from the MU 100 to the RU#1, RU#2 and RU#3 by the SDH processor 30 and the delay calculator 40. The controller 12 then controls the output timing of the signals to be transmitted to the RUs 200 through the modem 14 based on the calculated time delay values $\tau_1$, $\tau_2$ and $\tau_3$. As illustrated in FIG. 7, the controller 12 transmits pulse signals to the SDH processor 30 so that signals to be transmitted to the RU#1, RU#2 and RU#3 are transmitted at times $\tau_1$, $\tau_2$ and $\tau_3$, respectively, before a reference time 150 at which the signals should be transmitted to the corresponding RUs 200.

Accordingly, when transmitting a signal to a mobile station, the SDH processor 30 transmits the signal to each the corresponding RU 200 a certain amount of time in advance of the desired time when the RU 200 should have the signal. The amount of the advance is the time delay, i.e., $\tau_1$, $\tau_2$ or $\tau_3$, caused by the optical transmission line between the MU 100 and RU#1, RU#2 or RU#3, respectively. As a result, the signals transmitted to the respective RUs 200 arrive there with the same phase.

As described above, in a synchronous mobile communication system using an SDH, the present invention compensates for optical transmission delay thereby solving the problems of handover failure or signal detection failure caused by distance differences between an MU 100 and a plurality of RUs 200. In addition, when the present invention is applied, even a mobile communication system in which a BTS includes an MU 100 and an RU 200 can enjoy an advantageous of the SDH transmission technique.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for compensating for optical transmission delay in a synchronous mobile communication system in which a Base Station Transceiver Subsystem (BTS) includes a Main Unit (MU) for processing a mobile communication signal and a plurality of Remote Units (RUs) connected to the MU by Synchronous Digital Hierarchy (SDH) transmission, for performing radio processing for communication with a Mobile Station (MS), the method comprising:

forming a loop on an optical transmission line to each of the RUs for optical transmission delay compensation test between the MU and each of the RUs;

transmitting a test SDH frame to a corresponding RU once a loop for the optical transmission delay compensation test is formed, and measuring a delay time until the test SDH frame is fed back; and transmitting data to the corresponding RU after compensating transmission time as much as the measured delay time.

2. The method of claim 1, wherein the step of transmitting a test SDH frame to a corresponding RU comprises:

inserting a test pattern for the optical transmission delay compensation test into an overhead of the test SDH frame, and at the same time, counting a time;

transmitting the test SDH frame to a particular RU for which a test is performed through the loop, and receiving a feedback SDH frame from the particular RU; and detecting a test pattern signal from the overhead of the test SDH frame, and stopping time counting.

3. The method of claim 2, wherein the test pattern is inserted into an unused reserved field in the overhead of the test SDH frame.

4. The method of claim 1, wherein the delay time is measured by $$T_{delay} = \frac{\frac{T_{count}}{19.44 \text{ MHz}} - T_{process}}{2} \text{ or } \frac{(T_{count} \times P_{Clock}) - T_{process}}{2}$$

where $T_{delay}$ represents time delay of a signal due to an optical transmission line, $T_{count}$ represents a count value counted by a delay calculator, $T_{process}$ represents a processing time of an SDH frame processor, and $P_{clock}$ represents a period of a system clock.

5. The method of claim 1, wherein a transmission signal is previously transmitted as much earlier as the measured delay time.

6. An apparatus for compensating for optical transmission delay in a Main Unit (MU) for a synchronous mobile communication system in which a Base Station Transceiver Subsystem (BTS) includes the MU for processing a mobile communication signal and a plurality of Remote Units (RUs) connected to the MU by Synchronous Digital Hierarchy (SDH) transmission, for performing radio processing for communication with a Mobile Station (MS), the apparatus comprising:

a framer which is adapted to control formation of a loop for an optical transmission delay compensation test with each of the RUs, generate and transmit a test SDH frame, detect a feedback test frame, and calculate a delay time from a point where the test SDH frame is generated to a point where the feedback SDH frame is detected;

an electric/optic (E/O) interface which adapted to convert information output from the framer into an optical signal to transmit the optical signal to a corresponding RU, and convert an optical signal received from a particular RU into an electric signal to provide the electric signal to the framer; and a digital processor which adapted to compensate a phase of data to be transmitted to the RUs according to the delay time calculated by the framer, and provide the phase-compensated data to the framer.

7. The apparatus of claim 6, wherein the framer comprises:

a delay calculator adapted to count the delay time from a point where the test SDH frame is generated to a point where a feedback SDH frame is detected; and an SDH processor adapted to generate the test pattern to insert the generated test pattern into the test SDH frame, detect a test pattern from a received SDH frame, and generate a signal to be transmitted to a particular RU into a SDH frame.

8. The apparatus of claim 7, wherein the delay calculator calculates the delay time in accordance with the following formula.

$$T_{delay} = \frac{\frac{T_{count}}{19.44 \text{ MHz}} - T_{process}}{2} \text{ or } \frac{(T_{count} \times P_{Clock}) - T_{process}}{2}$$

where $T_{delay}$ represents time delay of a signal due to an optical transmission line, $T_{count}$ represents a count value counted by the delay calculator, $T_{process}$ represents a processing time of the SDH processor, and $P_{clock}$ represents a period of a system clock.

9. The apparatus of claim 7, wherein the SDH processor comprises:

a test pattern insertion and detection block adapted to generating a test pattern to insert the generated test pattern into the test SDH frame, and detecting a test pattern from a received SDH frame; and an SDH frame processor adapted to generate a signal to be transmitted to a particular RU into an SDH frame.

10. The apparatus of claim 6, wherein the digital processor comprises:

a controller adapted to transmit transmission data to the particular RU with a time advance equal to the delay time; and a modem adapted to modulating an output of the controller.

* * * * *